No. 889,130. PATENTED MAY 26, 1908.
W. A. HENDRYX.
APPARATUS FOR TREATING LIQUIDS.
APPLICATION FILED DEC. 1, 1906.

Witnesses:
Inventor:
Wilbur Alson Hendryx
By Leo D Bishop
Atty

UNITED STATES PATENT OFFICE.

WILBUR ALSON HENDRYX, OF DENVER, COLORADO.

APPARATUS FOR TREATING LIQUIDS.

No. 889,130.  Specification of Letters Patent.  Patented May 26, 1908.

Application filed December 1, 1906. Serial No. 345,919.

*To all whom it may concern:*

Be it known that I, WILBUR ALSON HENDRYX, a citizen of the United States, residing at Hotel Metropole, in the city of Denver, in the county of Denver and State of Colorado, have invented new and useful Improvements in Apparatus for Treating Liquids, of which the following is a specification.

The object of this invention is to provide an apparatus for treating liquids and separating solids therefrom; the apparatus is more particularly intended for separating the metallic values from metal-bearing solutions.

Figure 1:
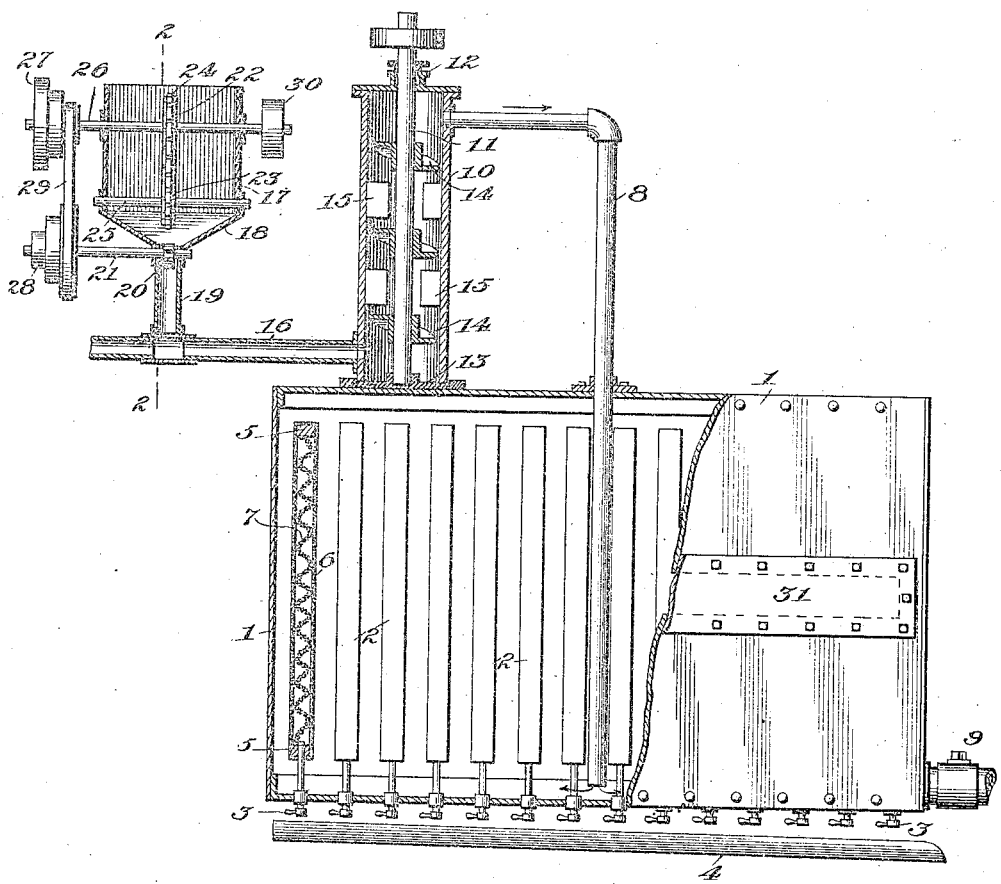
Figure 2:
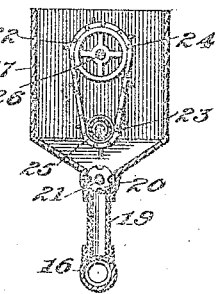

One form of the apparatus is shown in the accompanying drawing wherein:

Figure 1 is a vertical section, partly in elevation, of a form of device adapted for the separation of gold and silver from their cyanid or other solutions; and Fig. 2 is a vertical section of the feed device on line 2—2 of Fig. 1.

In the drawing, 1 represents a tank which may be of sheet metal and adapted to withstand a considerable internal pressure of liquid; 2, 2 are filter cells vertically disposed in the tank, each cell having a bottom outlet 3 provided with a valve or cock as shown, all of said outlets preferably discharging into a common conduit 4 for the filtered liquid. As shown each filter cell comprises an open frame 5 having lateral filtering walls 6 of canvas or other suitable material, and a filling 7 of material such as cocoa-matting or the like which is adapted to sustain the filter walls while providing a free passage for the solution.

The tank is shown as surmounted by a casing 10 containing a revoluble shaft 11 mounted in upper and lower bearings 12, 13, and carrying helical agitating blades 14; as shown the casing is provided with stationary baffles 15, the combined effect of the blades and baffles being to effect a thorough agitation of the material traversing the casing, and the precipitation of the greater portion of the values; the helical blades serve also as a pump to establish a current of the liquid or solution through the pipe 8 communicating with the tank 1 and the desired pressure of the same in the tank. An inlet pipe 16 is arranged adjacent the lower end of the casing.

17 is a hopper adapted to contain the precipitating agent and to effect its regulated discharge into the metal-bearing solution conveyed by the pipe 16. The hopper 17 is provided with an inclined bottom 18 and a central discharge pipe 19 leading to the pipe 16; a recessed feed-wheel 20 of usual construction is mounted in the discharge aperture of the hopper upon a shaft 21. By rotation of the recessed wheel measured or regulated charges of the material in the hopper are discharged into the stream of solution in the pipe 16 as will be readily understood.

The construction of the feed-hopper is claimed in my copending application Serial No. 344,058, filed November 19, 1906. As shown it is provided with an agitating device comprising upper and lower sprocket wheels 22, 23 carrying a sprocket chain 24 which passes through the body of material in the hopper and by its movement thoroughly agitates the same and prevents arching or other interruption of the feed. The sprocket wheel 23 is loosely mounted on a shaft 25, the sprocket 22 being rigidly mounted on the shaft 26. Speed-pulleys 27, 28 are secured upon the shafts 26 and 21, respectively, and are connected by a belt 29. The mechanism may be driven by a pulley 30 on shaft 26, or otherwise. By means of the speed-pulleys, and also by blocking one or more of the recesses in the wheel 20, a close regulation of the rate of feed of the precipitating agent may be secured.

Assuming the apparatus to be used for precipitating gold and silver from a cyanid solution, the operation is as follows: Zinc dust or fume is placed in the hopper 17 and the metal-bearing solution is admitted to the pipe 16. By operation of the feed-device in the hopper zinc dust is fed to the flowing solution in the proportion required to precipitate the metallic values therein or in slight excess of such proportion. In the casing 10 the solution and precipitant are thoroughly commingled by the blades and baffles and the greater portion of the metallic values is separated. The liquid carrying the precipitated values and undissolved precipitant in suspension passes to the tank 1, from which the clear solution flows through the filter cells to the conduit 4, to be returned to the leaching vats after any required treatment for the restoration of its solvent power.

The undissolved residue of the precipitant, together with the precipitated values, collects upon the canvas or other filtering medium 6 in the form of a porous coating through which all further portions of the liquid must pass: in this coating the solution is brought into intimate contact with the undissolved zinc and any gold or silver which may remain in solution is separated. After a sufficient quantity of precipitate has been collected the liquid contents of the tank are discharged and the coating is dislodged from the filter, as by a stream of water admitted through the elongated hand-hold 31, and the metals are withdrawn through valved outlet 9 and refined in any suitable manner.

It will be noted that the discharge pipe 8 from the casing 10 extends nearly to the bottom of the tank 1 and is substantially central therein. The purpose of this arrangement is to prevent any considerable proportion of the zinc or the precipitated values from depositing on the bottom of the tank, and to cause the same to form a cake or deposit upon the filtering surfaces as above described.

While I have described the apparatus as applied to the separation and recovery of gold and silver from their solutions, it will be obvious that it is adapted for other uses involving precipitation and filtration; for instance it is adapted for the treatment of water and other liquids by adding a purifying agent from the hopper 17, commingling it with the liquid in the casing 10, and separating the solids by filtration in the tank 1. The filtration may be conducted solely under the pressure of the column of liquid in the tank 1 and the conduits leading thereto, or suction may be applied to the filter outlets. It will be obvious that the zinc dust may be fed directly to the casing 10 instead of to the liquid conduit adjacent thereto.

I claim:

1. Apparatus for treating liquids comprising a tank, a plurality of filter cells therein, means for establishing a stream of metal-bearing solution through said tank and filter cells, and means for adding a treating agent to said stream and commingling it therewith.

2. Apparatus for treating liquids comprising a tank, a plurality of filter cells therein, a casing communicating with said tank and provided with an agitator, means for establishing a stream of metal-bearing solution through said casing, tank and filter cells, and means for adding a treating agent to said stream.

3. Apparatus for treating liquids comprising a closed tank, a plurality of filter cells therein, means for establishing a stream of metal-bearing solution through said tank and filter cells, and means for adding a treating agent to said stream and commingling it therewith.

4. Apparatus for treating liquids comprising a closed tank, a plurality of filter cells therein, a casing communicating with said tank and provided with an agitator, a liquid-supply conduit communicating with said casing, and a feed device communicating with said conduit.

5. Apparatus for treating liquids comprising a closed tank, a filter therein, a casing communicating with said tank and provided with an agitator, and means for supplying a liquid and a treating agent to said casing, said agitator constructed to establish a liquid pressure in said tank.

6. Apparatus for treating liquids comprising a closed tank, a plurality of filter cells therein, a casing communicating with said tank and provided with an agitator, and means for supplying a liquid and a treating agent to said casing, said agitator constructed to establish a liquid pressure in said tank.

7. Apparatus for treating liquids comprising a tank, a plurality of filter cells therein, a casing communicating with said tank and provided with an agitator, said agitator constructed to establish a liquid pressure in said tank, and a liquid supply conduit and feed device communicating with said casing, said feed device provided with means for regulating the discharge therefrom.

8. Apparatus for treating liquids comprising a tank, a plurality of filter cells therein, a casing provided with an agitator, means for supplying a liquid and a treating agent to said casing, and a conduit extending between said casing and the lower portion of said tank.

9. Apparatus for treating liquids comprising a closed tank, a plurality of filter cells therein, a casing communicating with the lower portion of said tank and provided with an agitator, and means for supplying a liquid and a treating agent to said casing, said agitator constructed to establish a liquid pressure in said tank.

In testimony whereof I affix my signature in presence of two witnesses.

WILBUR ALSON HENDRYX.

Witnesses:
 THEODORA WELLS,
 CHAS. R. DAVIES.